(12) United States Patent
Nydam et al.

(10) Patent No.: US 11,718,238 B2
(45) Date of Patent: Aug. 8, 2023

(54) ROOF RAIL WITH DIVIDER WALL CONFIGURED TO RESIST CLAMPING FORCE

(71) Applicant: Ford Global Technologies, LLC, Dearborn, MI (US)

(72) Inventors: Scott Nydam, Farmington Hills, MI (US); Jeffrey Scott Mayville, Ypsilanti, MI (US); Patrick James Blanchard, Ann Arbor, MI (US); Ari Garo Caliskan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 16/709,061

(22) Filed: Dec. 10, 2019

(65) Prior Publication Data

US 2021/0170953 A1 Jun. 10, 2021

(51) Int. Cl.
  *B60R 9/04* (2006.01)
  *B60R 13/06* (2006.01)
  *B62D 27/02* (2006.01)

(52) U.S. Cl.
  CPC .............. *B60R 9/04* (2013.01); *B60R 13/06* (2013.01); *B62D 27/02* (2013.01)

(58) Field of Classification Search
  CPC ............ B60R 9/04; B60R 9/052; B60R 9/058
  See application file for complete search history.

(56) References Cited

U.S. PATENT DOCUMENTS

| 3,451,602 | A  | * | 6/1969  | Bott ........................ B60R 9/04 224/326 |
| 6,338,428 | B1 | * | 1/2002  | Kawasaki ................. B60R 9/04 224/326 |
| 8,449,018 | B2 | * | 5/2013  | Grgac ................. B29C 45/1711 296/205 |
| 2014/0183235 | A1 | * | 7/2014  | Hubbard ................. B60R 9/058 224/309 |
| 2015/0175082 | A1 | * | 6/2015  | Aftanas ................... B60R 9/058 224/309 |

FOREIGN PATENT DOCUMENTS

| CA | 2660716 A1 | | 3/2008 | |
| CN | 108944699 A | * | 12/2018 | .............. B60R 9/05 |
| CN | 112124207 A | | 12/2020 | |
| DE | 4422421 C1 | * | 9/1995 | .............. B60R 9/04 |
| DE | 202005012176 U1 | | 10/2005 | |
| DE | 102006030760 A1 | * | 12/2007 | ......... B29C 45/1704 |
| DE | 102014206719 A1 | * | 8/2015 | ............. B60R 9/058 |
| FR | 2657055 A | * | 7/1991 | ............. B60R 13/04 |
| GB | 2386591 A | * | 9/2003 | .............. B60R 9/04 |
| KR | 1020150062601 | * | 6/2015 | |
| KR | 20150144051 | * | 12/2015 | |
| KR | 101727359 B1 | | 4/2017 | |
| WO | 2008000412 A1 | | 1/2008 | |
| WO | WO-2016055467 A1 | * | 4/2016 | ........... B60Q 1/2661 |

* cited by examiner

*Primary Examiner* — Scott T McNurlen
(74) *Attorney, Agent, or Firm* — Vichit Chea; Carlson, Gaskey & Olds, P.C.

(57) ABSTRACT

This disclosure relates to a roof rail for a motor vehicle. In particular, the roof rail includes a divider wall configured to resist a clamping force, such as that which is expected to be applied to the roof rail from a cross bar of a roof rack. An example assembly includes a roof rail with a closed cross-sectional area and an open cross-sectional area separated by a divider wall.

19 Claims, 4 Drawing Sheets

ROOF RAIL WITH DIVIDER WALL CONFIGURED TO RESIST CLAMPING FORCE

TECHNICAL FIELD

This disclosure relates to a roof rail for a motor vehicle. In particular, the roof rail includes a divider wall configured to resist a clamping force.

BACKGROUND

Some motor vehicles include roof rails, which extend along the sides of a roof, and which are used as mounting points for gear, such as luggage or sporting equipment. Roof racks including cross bars may extend between the roof rails. The cross bars are typically clamped to the roof rails.

SUMMARY

A motor vehicle assembly according to an exemplary aspect of the present disclosure includes, among other things, a roof rail including a closed cross-sectional area and an open cross-sectional area separated by a divider wall.

In a further non-limiting embodiment of the foregoing assembly, the divider wall is positioned to correspond to an expected clamping load path of a cross bar.

In a further non-limiting embodiment of any of the foregoing assemblies, the divider wall is substantially aligned with the expected clamping load path of the cross bar.

In a further non-limiting embodiment of any of the foregoing assemblies, the divider wall is slightly beneath the expected clamping load path of the cross bar.

In a further non-limiting embodiment of any of the foregoing assemblies, the roof rail includes a substantially constant exterior shape along substantially an entire length of the roof rail.

In a further non-limiting embodiment of any of the foregoing assemblies, the roof rail includes a first side wall having a first end and a second end, a second side wall having a first end and a second end, and a cap wall extending between the second end of the first side wall and the second end of the second side wall.

In a further non-limiting embodiment of any of the foregoing assemblies, the assembly includes an elastomeric seal overmolded with the roof rail and projecting outwardly from the roof rail.

In a further non-limiting embodiment of any of the foregoing assemblies, the seal is attached to and projects from the first end of the first wall and the first end of the second wall.

In a further non-limiting embodiment of any of the foregoing assemblies, the divider wall extends between the first side wall and the second side wall, the divider wall projects from the first side wall at a first location between the first end and the second end of the first side wall, and the divider wall projects from the second side wall at a second location between the first end and the second end of the second side wall.

In a further non-limiting embodiment of any of the foregoing assemblies, an exterior dimension of the roof rail is reduced adjacent the first location and the second location.

In a further non-limiting embodiment of any of the foregoing assemblies, the first side wall includes a first section projecting toward the second side wall at the first location and the second side wall includes a second section projecting toward the first side wall at the second location.

In a further non-limiting embodiment of any of the foregoing assemblies, the assembly includes a mounting bracket partially overmolded with the roof rail.

In a further non-limiting embodiment of any of the foregoing assemblies, the mounting bracket includes a first plate and a second plate, the first plate is overmolded with the divider wall, and the second plate includes a base attached to the first plate and two feet projecting from the base.

In a further non-limiting embodiment of any of the foregoing assemblies, the feet are attached to fasteners configured to fasten the attachment bracket to a roof panel.

In a further non-limiting embodiment of any of the foregoing assemblies, the roof rail is made of a polymer material.

In a further non-limiting embodiment of any of the foregoing assemblies, the divider wall includes at least one port permitting water to flow into the closed cross-sectional area during manufacturing.

In a further non-limiting embodiment of any of the foregoing assemblies, the roof rail is a first roof rail, and the assembly further includes a second roof rail and a cross-bar clamped to the first and second roof rails.

A method according to an exemplary aspect of the present disclosure includes, among other things, using an injection molding process to form a roof rail. The roof rail includes closed cross-sectional area and an open cross-sectional area separated by a divider wall.

In a further non-limiting embodiment of the foregoing method, the closed cross-sectional area is formed using a water-assisted injection molding process.

In a further non-limiting embodiment of any of the foregoing methods, the method includes overmolding a seal with the roof rail and overmolding an mounting bracket with the roof rail.

DETAILED DESCRIPTION

This disclosure relates to a roof rail for a motor vehicle. In particular, the roof rail includes a divider wall configured to resist a clamping force, such as that which is expected to be applied to the roof rail from a cross bar of a roof rack. An example assembly includes a roof rail with a closed cross-sectional area and an open cross-sectional area separated by a divider wall. The roof rail is manufactured in a manner that reduces material waste, especially relative to extruded metal roof rails, and in a manner that does not compromise the ability of the roof rail to resist clamping loads. These and other benefits will be appreciated from the following description.

Figure 1:
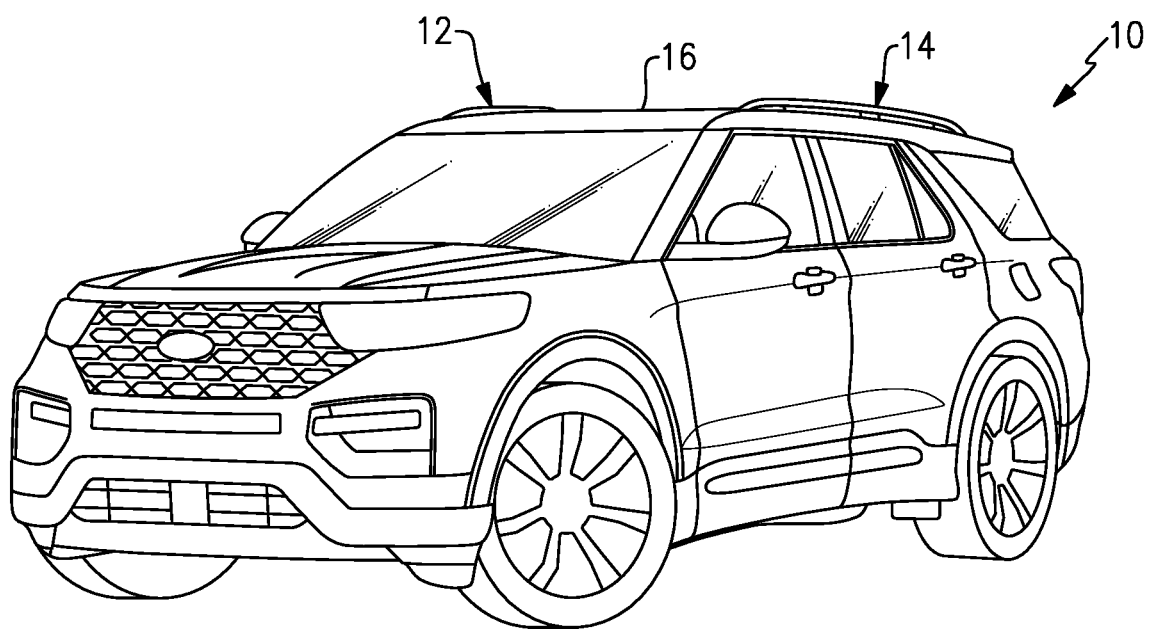
FIG. 1 is a perspective view of an example motor vehicle including roof rails.

Referring to the drawings, FIG. 1 is a front-perspective view of a motor vehicle 10 ("vehicle 10"). While an SUV is pictured in FIG. 1, this disclosure is also applicable to other types of vehicles. The vehicle 10 includes first and second roof rails 12, 14 extending along opposite sides of a roof 16 of the vehicle 10.

Figure 2:
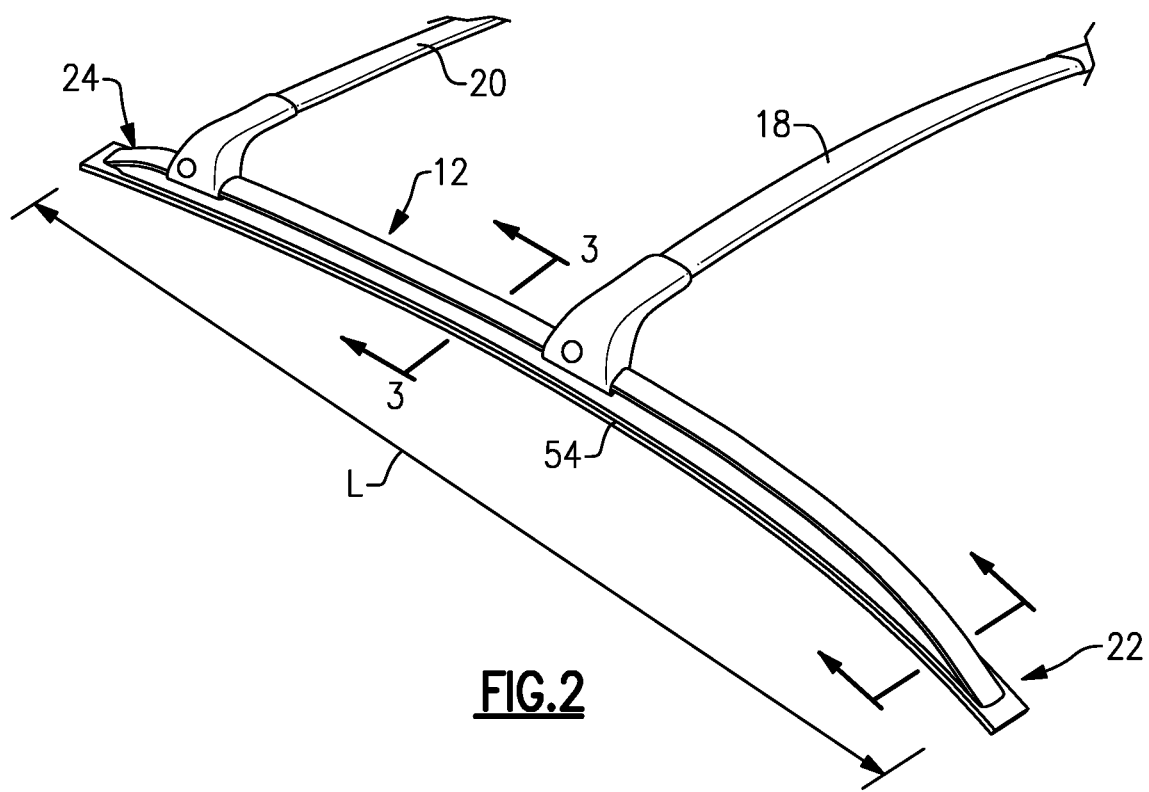
FIG. 2 is a perspective view of an example roof rail and two cross bars.

FIG. 2 illustrates the first roof rail 12 and portions of first and second cross bars 18, 20. The first and second cross bars 18, 20 clamp to the first roof rail 12 and the second roof rail 14. The first and second cross bars 18, 20 are part of a roof rack, in this example. The first roof rail 12 will now be described in detail. It should be understood that the second roof rail 14 is configured substantially similarly to the first roof rail 12. In one example, the second roof rail 14 is essentially a mirror image of the first roof rail 12, reflected about the centerline of the vehicle 10.

The first roof rail 12 includes a substantially constant outer profile along substantially its entire length. Specifically, the first roof rail 12 exhibits a length L between a first end 22 and a second end 24. With the exception of locations adjacent the ends 22, 24, the first roof rail 12 exhibits a constant outer profile. In this way, the cross bars 18, 20 may be clamped at most if not all locations along the length of the first roof rail 12. In a particular example, the cross bars 18, 20 are infinitely adjustable relative to the first and second roof rail 12, 14.

Figure 3:
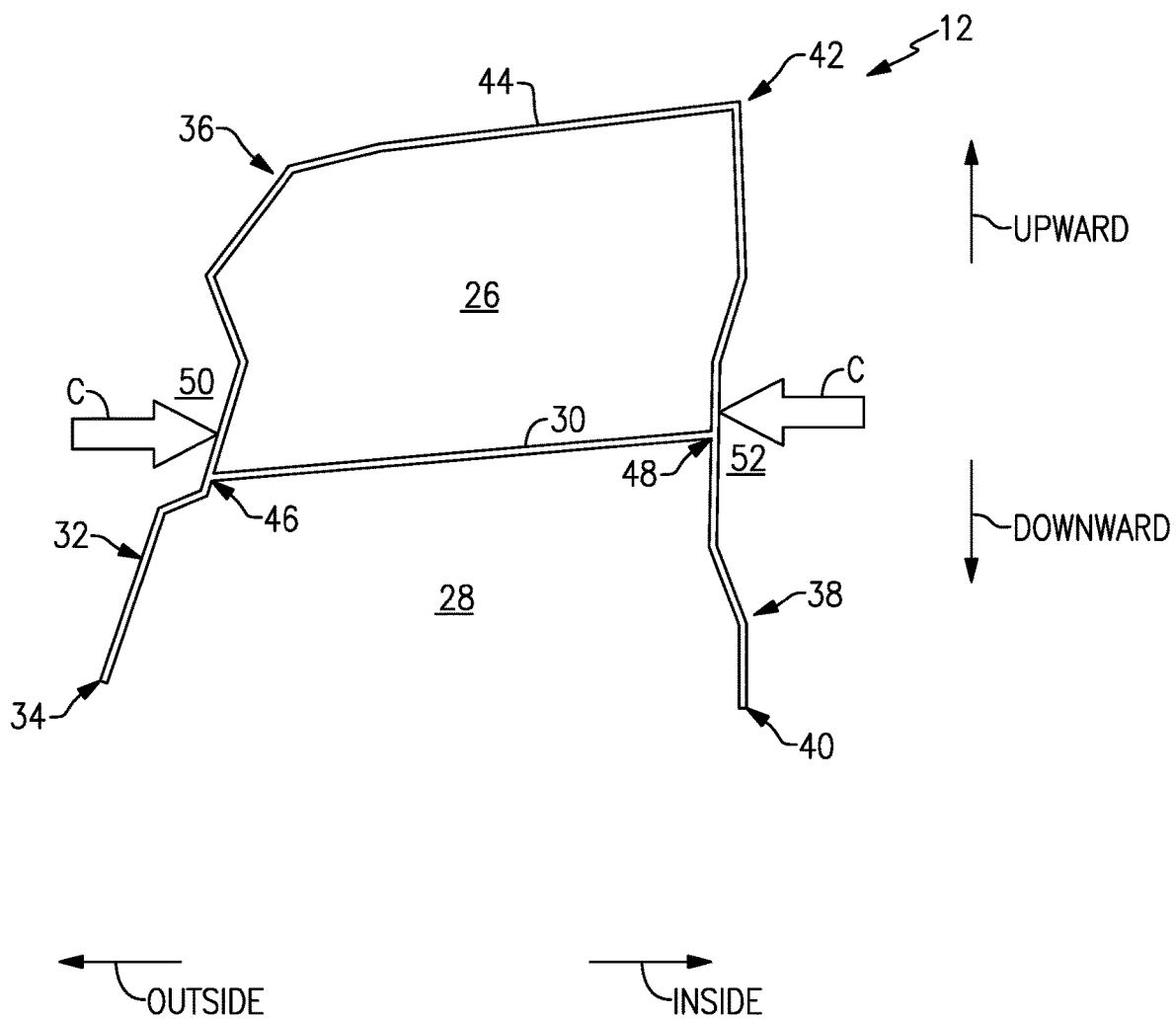
FIG. 3 is a cross-sectional view of the roof rail taken along line 3-3 from FIG. 2.

FIG. 3 illustrates the first roof rail 12 in cross-section. In FIG. 3, the first roof rail 12 includes a closed cross-sectional area 26 and an open cross-sectional area 28 separated by a divider wall 30. The closed cross-sectional area 26 is vertically above (the "upward" and "downward" directions are labeled in FIG. 3 for reference) the open cross-sectional area 28, in this example.

The divider wall 30 extends generally in a horizontal direction (i.e., in a direction generally parallel to the "inside" and "outside" directions, which refer to directions relative to a centerline of the vehicle 10) between outer walls of the first roof rail 12. The divider wall 30 is configured to resist a clamping load applied by clamps of the cross bars 18, 20. An example expected clamping load path C is represented in FIG. 3 by two arrows. The divider wall 30 is positioned to correspond to the expected clamping load path C. In the example of FIG. 3, the divider wall 30 is slightly beneath the expected clamping load path C. In other examples, the divider wall 30 is substantially aligned with the expected clamping load path C. In one example, the divider wall 30 is present along the entire length L of the first roof rail 12 and is configured to resist clamping loads at any point along the length L.

In this example, the first roof rail 12 includes a first, outer side wall 32 extending vertically between a first, lower end 34 and a second, upper end 36. Opposite the first side wall 32, the first roof rail 12 also includes a second, inner side wall 38 extending between a first, lower end 40 and a second, upper end 42. A cap wall 44 extends between the second end 36 of the first side wall 32 and the second end 42 of the second side wall 38. The cap wall 44 is spaced-apart from and extends in a direction substantially parallel to the divider wall 30. Further, the first ends 34, 40 are spaced-apart from one another in the horizontal direction.

The closed cross-sectional area 26 is bound on all sides. In this example, the closed cross-sectional area 26 is bound by an upper surface of the divider wall 30, an upper portion of the first side wall 32, an upper portion of the second side wall 38, and the cap wall 44. The open cross-sectional area 28 is bound on three sides by a lower surface of the divider wall 30, a lower portion of the first side wall 32, and a lower portion of the second side wall 38. In this example, the open cross-sectional area 28 is open facing the downward direction, namely toward a portion of the roof 16.

In the example of FIG. 3, the divider wall 30 extends between the first side wall 32 and the second side wall 38. The divider wall 30 projects from the first side wall 32 at a first location 46 vertically between the first end 34 and the second end 36 of the first side wall 32. Likewise, the divider wall 30 projects from the second side wall 38 at a second location 48 vertically between the first end 40 and the second end 42 of the second side wall 38.

The first and second locations 46, 48 correspond to the expected clamping load path C, and in this example a dimension of the first roof rail 12 is reduced adjacent the first location 46 and the second location 48. Namely, the first side wall 32 includes a first longitudinal groove 50 and the second side wall 38 includes a second longitudinal groove 52, each of which extend along substantially the entire length L. The first longitudinal groove 50 is a section recessed in the "inside" direction and toward the second side wall 38 relative to adjacent surfaces of the first side wall 32. The second longitudinal groove 52 is a section recessed in the "outside" direction and toward the first side wall 32 relative to adjacent surfaces of the second side wall 38. The first and second locations 46, 48 are vertically aligned with the first and second longitudinal grooves 50, 52. In this example, the first and second locations 46, 48 are slightly vertically offset from one another such that the divider wall 30 exhibits a slight incline relative to a horizontal plane (normal to the direction of gravity). The divider wall 30 could lie in a horizontal plane in other examples.

The first roof rail 12 is integrally formed as a single, one-piece component in one example. In another example, the first roof rail 12 is overmolded with other structures, in which case the first roof rail 12 is still a single, integrated component. Overmolding is the process of adding material, such as the material forming the first roof rail 12, over already-existing pieces or parts using a molding process. For instance, the first roof rail 12 in this example is overmolded with an elastomeric seal 54 (FIG. 2). The elastomeric seal 54 encircles the entire first roof rail 12 in this example. The elastomeric seal 54 increases the aesthetic appearance of the first roof rail 12 by providing a smooth transition between the first roof rail 12 and the roof 16. The elastomeric seal 54 is attached to and projects outward from the first ends 34, 40. Namely, the elastomeric seal projects in the "outside" direction from the first end 34 and in the "inside" direction from the first end 40. The elastomeric seal 54 could be formed with the first rail 12 using a two shot molding process. In an example first step of such a process, at least a majority of the first roof rail 12 is molded of a first polymer or composite material. In a second step, the elastomeric seal material is molded over material injected during the first step.

Figure 4B:
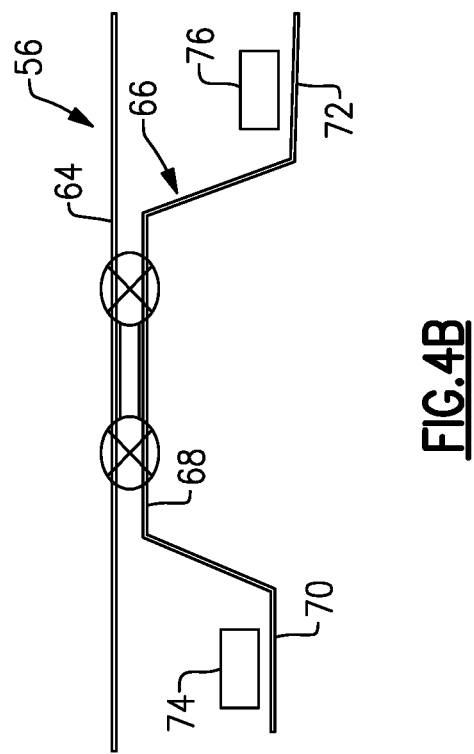
FIG. 4B is a cross-sectional view taken along line 4B-4B from FIG. 4A and illustrates the mounting bracket in more detail.
Figure 4A:
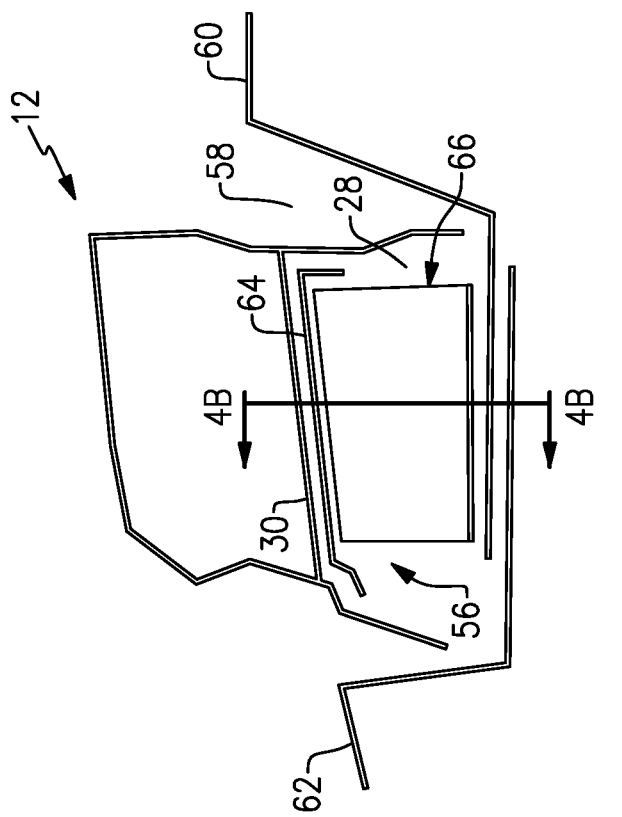
FIG. 4A is a cross-sectional view of the roof rail similar to FIG. 3, and illustrates the roof rail relative to an example mounting bracket adjacent a portion of the roof of the vehicle.

Another example structure which may be overmolded with the first roof rail 12 is a mounting bracket. An example mounting bracket 56 is somewhat schematically illustrated in FIGS. 4A and 4B. While only one mounting bracket is shown, additional mounting brackets may be used to attach the first roof rail 12 to the roof 16.

The mounting bracket 56 is partially overmolded with the first roof rail 12. Specifically, a portion of the mounting bracket 56 is overmolded with the divider wall 30 and another portion of the mounting bracket 56 projects from the divider wall 30 downward into the open cross-sectional area

28. The mounting bracket 56 and the first roof rail 12 are configured to fit within a channel 58 between inner and outer panels 60, 62 of the roof 16, in this example. The open cross-sectional area 28 facilitates attachment of fasteners between the mounting bracket 56 and the inner and outer panels 60, 62.

The mounting bracket 56 in this example includes a first plate 64 and a second plate 66, both of which may be metallic. The first plate 64 is an upper plate, in this example, and is overmolded with the divider wall 30. The second plate 66 includes a base 68 attached to the first plate 64 by welding, for example, and two feet 70, 72 projecting from the base 68. Welds are represented by the circled "X" marks in FIG. 4B. The feet 70, 72 are attached to fasteners 74, 76, which in this example are weld nuts welded to the feet 70, 72 and configured to receive a fastener, such as a bolt, which also engages the inner and outer panels 60, 62. The fasteners 74, 76 may directly contact the respective feet 70, 72. The feet 70, 72 are spaced-apart from the base 68 in the downward direction by respective inclined walls, in this example. The feet 70, 72 lie in a plane substantially parallel to the base 68 in this example.

The first roof rail 12 is made of a polymer material or a composite material. The first roof rail 12 may be made by injection molding in one example. Specifically, the closed cross-sectional area 26 may be made using a water-assisted injection molding process. In such a process, water is used to push polymer material, for example, to the outer perimeter of a mold cavity to form a hollow cross-section. To this end, the ends of the first roof rail 12 or the divider wall 30 may include at least one port permitting water to flow into and out of the closed cross-sectional area 26 during manufacturing. While the divider wall 30 may include a port, the closed cross-sectional area 26 is still fully closed at the vast majority of cross-sections taken along the length L.

Directional terms such as "upward," "above," "downward," "under," "below," "side," "inside," "outside," "horizontal," etc., are used herein with reference to the normal operational attitude of a motor vehicle. It should be understood that terms such as "slightly," "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle assembly, comprising:
a roof rail including a closed cross-sectional area and an open cross-sectional area separated by a divider wall, wherein the roof rail includes a first side wall having a first end and a second end, a second side wall having a first end and a second end, and a cap wall extending between the second end of the first side wall and the second end of the second side wall,
wherein the first side wall includes a first groove recessed toward the second side wall in a horizontal direction relative to adjacent surfaces of the first side wall both vertically above and vertically beneath the first groove,
wherein the second side wall includes a second groove recessed toward the first side wall in a horizontal direction relative to adjacent surfaces of the second side wall both vertically above and vertically beneath the second groove,
wherein the divider wall extends between the first side wall and the second side wall,
wherein the divider wall projects from the first side wall at a first location vertically aligned with the first groove,
wherein the divider wall projects from the second side wall at a second location vertically aligned with the second groove,
wherein the first groove is partially defined by a substantially planar segment of the first side wall,
wherein the second groove is partially defined by a substantially planar segment of the second side wall,
wherein the first location is on the substantially planar segment of the first side wall,
wherein the second location is on the substantially planar segment of the second side wall,
wherein the substantially planar segment of the first side wall lies in a first plane, and the substantially planar segment of the second side wall lies in a second plane non-parallel to the first plane,
wherein the first side wall includes an upper segment vertically above the substantially planar segment of the first side wall and spaced-apart from the first plane in a horizontal direction away from the second side wall,
wherein the first side wall includes a lower segment vertically below the substantially planar segment of the first side wall and spaced-apart from the first plane in a horizontal direction away from the second side wall,
wherein the second side wall includes an upper segment vertically above the substantially planar segment of the second side wall and spaced-apart from the second plane in a horizontal direction away from the first side wall, and
wherein the second side wall includes a lower segment vertically below the substantially planar segment of the second side wall and spaced-apart from the second plane in a horizontal direction away from the first side wall.

2. The assembly as recited in claim 1, wherein the roof rail includes a substantially constant exterior shape along substantially an entire length of the roof rail.

3. The assembly as recited in claim 1, further comprising an elastomeric seal overmolded with the roof rail and projecting outwardly from the roof rail.

4. The assembly as recited in claim 3, wherein the seal is attached to and projects from the first end of the first wall and the first end of the second wall.

5. The assembly as recited in claim 1, wherein the first location is vertically offset from the second location.

6. The assembly as recited in claim 5, wherein an exterior dimension of the roof rail is reduced adjacent the first location and the second location.

7. The assembly as recited in claim 6, wherein the first side wall includes a first section projecting toward the second side wall at the first location and the second side wall includes a second section projecting toward the first side wall at the second location.

8. The assembly as recited in claim 1, further comprising a mounting bracket partially overmolded with the roof rail.

9. The assembly as recited in claim 1, wherein the roof rail is made of a polymer material.

10. The assembly as recited in claim 1, wherein the divider wall includes at least one port permitting water to flow into the closed cross-sectional area during manufacturing.

11. The assembly as recited in claim 1, wherein the roof rail is a first roof rail, and the assembly further includes a second roof rail and a cross-bar clamped to the first and second roof rails.

12. The assembly as recited in claim 1, wherein the divider wall is a flat, planar wall when viewed in cross-section.

13. The assembly as recited in claim 1, wherein substantially an entirety of the divider wall lies in a common plane.

14. The assembly as recited in claim 1, wherein the upper and lower segments of the first and second side walls are substantially planar.

15. A motor vehicle assembly, comprising:
    a roof rail including a closed cross-sectional area and an open cross-sectional area separated by a divider wall,
    wherein the roof rail includes a first side wall having a first end and a second end, a second side wall having a first end and a second end, and a cap wall extending between the second end of the first side wall and the second end of the second side wall,
    wherein the first side wall includes a first groove recessed toward the second side wall relative to adjacent surfaces of the first side wall both vertically above and vertically beneath the first groove,
    wherein the second side wall includes a second groove recessed toward the first side wall relative to adjacent surfaces of the second side wall both vertically above and vertically beneath the first groove,
    wherein the divider wall extends between the first side wall and the second side wall,
    wherein the divider wall projects from the first side wall at a first location vertically aligned with the first groove,
    wherein the divider wall projects from the second side wall at a second location vertically aligned with the second groove,
    wherein the motor vehicle further comprises a mounting bracket partially overmolded with the roof rail,
    wherein the mounting bracket includes a first plate and a second plate,
    wherein the first plate is overmolded with the divider wall, and
    wherein the second plate includes a base attached to the first plate and two feet projecting from the base.

16. The assembly as recited in claim 15, wherein the feet are attached to weld nuts configured to fasten the attachment bracket to a roof panel.

17. A method, comprising:
    using an injection molding process to form a roof rail, wherein the roof rail includes closed cross-sectional area and an open cross-sectional area separated by a divider wall,
    wherein the roof rail includes a first side wall having a first end and a second end, a second side wall having a first end and a second end, and a cap wall extending between the second end of the first side wall and the second end of the second side wall,
    wherein the first side wall includes a first groove recessed toward the second side wall in a horizontal direction relative to adjacent surfaces of the first side wall both vertically above and vertically beneath the first groove,
    wherein the second side wall includes a second groove recessed toward the first side wall in a horizontal direction relative to adjacent surfaces of the second side wall both vertically above and vertically beneath the second groove,
    wherein the divider wall extends between the first side wall and the second side wall,
    wherein the divider wall projects from the first side wall at a first location vertically aligned with the first groove,
    wherein the divider wall projects from the second side wall at a second location vertically aligned with the second groove,
    wherein the first groove is partially defined by a substantially planar segment of the first side wall,
    wherein the second groove is partially defined by a substantially planar segment of the second side wall,
    wherein the first location is on the substantially planar segment of the first side wall,
        wherein the second location is on the substantially planar segment of the second side wall,
    wherein the substantially planar segment of the first side wall lies in a first plane, and the substantially planar segment of the second side wall lies in a second plane non-parallel to the first plane,
        wherein the first side wall includes an upper segment vertically above the substantially planar segment of the first side wall and spaced-apart from the first plane in a horizontal direction away from the second side wall,
    wherein the first side wall includes a lower segment vertically below the substantially planar segment of the first side wall and spaced-apart from the first plane in a horizontal direction away from the second side wall,
    wherein the second side wall includes an upper segment vertically above the substantially planar segment of the second side wall and spaced-apart from the second plane in a horizontal direction away from the first side wall, and
    wherein the second side wall includes a lower segment vertically below the substantially planar segment of the second side wall and spaced-apart from the second plane in a horizontal direction away from the first side wall.

18. The method as recited in claim 17, wherein the closed cross-sectional area is formed using a water-assisted injection molding process.

19. The method as recited in claim 18, further comprising overmolding a seal with the roof rail and overmolding a mounting bracket with the roof rail.

* * * * *